US008531850B2

(12) United States Patent
Oka et al.

(10) Patent No.: US 8,531,850 B2
(45) Date of Patent: Sep. 10, 2013

(54) CAPACITOR CIRCUIT AND POWER CONVERSION CIRCUIT INCLUDING A RESONANT FREQUENCY ADJUSTMENT ELEMENT

(75) Inventors: Shoji Oka, Nagaokakyo (JP); Shigeki Nishiyama, Nagaokakyo (JP); Shinichi Kobayashi, Nagaokakyo (JP); Kazuyoshi Obara, Yuzawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/958,477

(22) Filed: Dec. 2, 2010

(65) Prior Publication Data

US 2011/0292686 A1 Dec. 1, 2011

Related U.S. Application Data

(63) Continuation of application No. PCT/JP2009/059736, filed on May 28, 2009.

(30) Foreign Application Priority Data

Jun. 3, 2008 (JP) ................. 2008-145241

(51) Int. Cl.
*H02M 1/14* (2006.01)

(52) U.S. Cl.
USPC ........................................................... 363/40

(58) Field of Classification Search
USPC ............... 363/13, 15, 39, 44, 47, 81, 84, 125
See application file for complete search history.

(56) References Cited

U.S. PATENT DOCUMENTS

| 4,939,486 A | * | 7/1990 | Bergdahl et al. ............. 333/175 |
| 5,260,862 A | * | 11/1993 | Marsh ............................ 363/39 |
| 5,697,087 A | * | 12/1997 | Miya et al. .................... 455/307 |
| 6,600,294 B1 | * | 7/2003 | DiPiazza ....................... 323/212 |
| 2003/0030385 A1 | | 2/2003 | Toyama |
| 2004/0090803 A1 | * | 5/2004 | Kerstetter ....................... 363/39 |
| 2005/0267724 A1 | | 12/2005 | Niki et al. |
| 2007/0171681 A1 | * | 7/2007 | Baarman ......................... 363/16 |
| 2008/0265910 A1 | * | 10/2008 | Gasperi ......................... 324/629 |

FOREIGN PATENT DOCUMENTS

| JP | 1-321868 A | 12/1989 |
| JP | 11-98852 A | 4/1999 |
| JP | 2003-051394 A | 2/2003 |
| JP | 2005-328651 A | 11/2005 |
| JP | 2005-339157 A | 12/2005 |
| JP | 2008-099397 A | 4/2008 |
| JP | 2009-038961 A | 2/2009 |

OTHER PUBLICATIONS

Official Communication issued in International Patent Application No. PCT/JP2009/059736, mailed on Aug. 4, 2009.
Official Communication issued in corresponding Japanese Patent Application No. 2010-515842, mailed on Sep. 18, 2012.
Official Communication issued in corresponding Japanese Patent Application No. 2010-515842, mailed on May 21, 2013.

* cited by examiner

*Primary Examiner* — Adolf Berhane
*Assistant Examiner* — Jeffrey Gblende
(74) *Attorney, Agent, or Firm* — Keating & Bennett, LLP

(57) ABSTRACT

A capacitor circuit includes a first capacitor line including a film capacitor and a second capacitor line including a ceramic capacitor that are connected in parallel with each other. The second capacitor line includes an inductance element that is connected in series with the ceramic capacitor. The inductance element is set to a value such that a series resonant frequency of the first capacitor line and a series resonant frequency of the second capacitor line are matched.

8 Claims, 14 Drawing Sheets

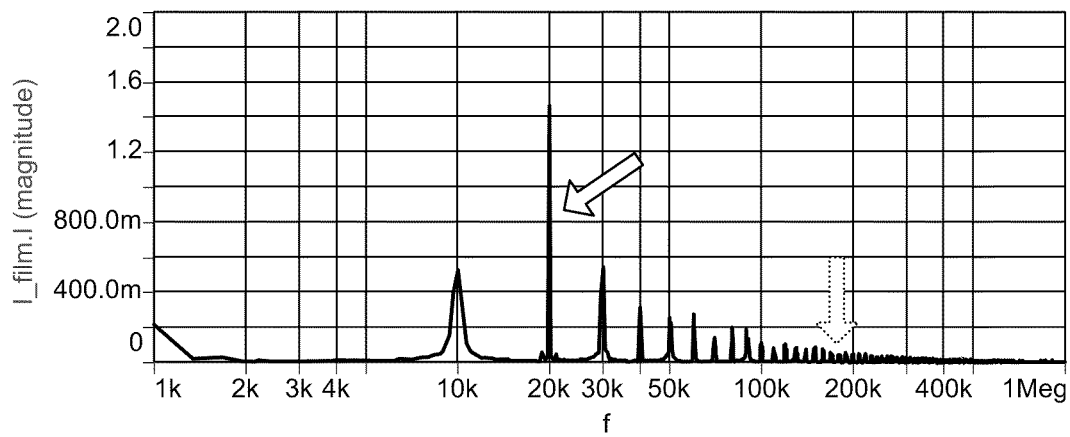
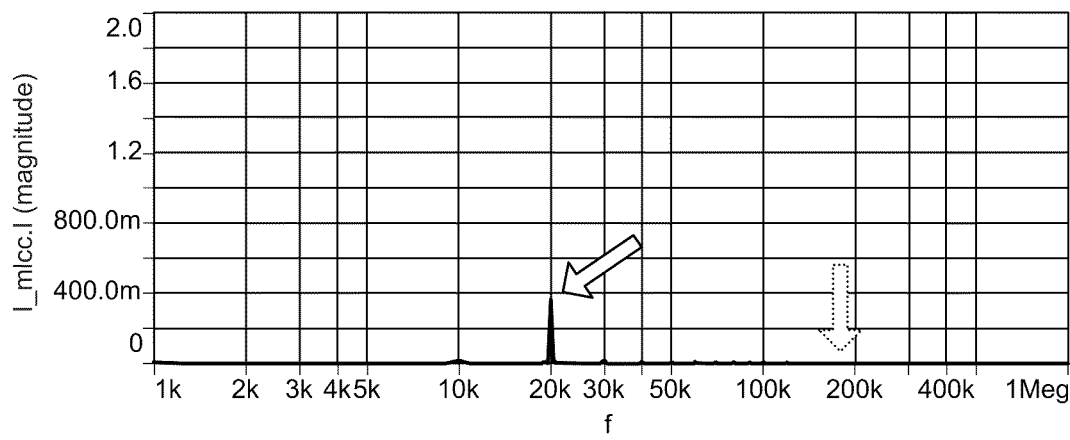

CAPACITOR CIRCUIT AND POWER CONVERSION CIRCUIT INCLUDING A RESONANT FREQUENCY ADJUSTMENT ELEMENT

BACKGROUND OF THE INVENTION

1. Field of the Invention

The present invention relates to a capacitor circuit in which multiple capacitor lines having capacitors connected thereto are connected in parallel with each other. In particular, the present invention relates to a smoothing capacitor circuit in a power conversion circuit that converts alternating-current power into direct-current power.

2. Description of the Related Art

Inverter circuits are used as circuits that provide alternating-current power to a motor in an electric car, hybrid car, or other suitable devices. Inverter circuits generally include a battery, which is a direct-current power supply, a conversion circuit, which converts direct-current power into alternating-current power, and a smoothing capacitor circuit, which is connected between the battery and the conversion circuit (see, for example, Japanese Unexamined Patent Application Publication No. 11-98852). Film capacitors primarily made of a polypropylene film (P.P.) are currently being used as capacitors for use in a smoothing capacitor circuit.

In film capacitors, the allowable ripple current per unit volume or per unit capacitance is limited by the operating temperature. Thus, in order for an inverter circuit to meet the requirements of the allowable ripple current in a high-current system, such as a car-mounted system, under an operating environment (operating temperature, etc.) that is harsh for electronic components, its smoothing circuit must ensure a capacitance equal to or greater than a required capacitance. For this reason, a capacitor circuit in which a film capacitor has an increased size or a capacitor circuit in which multiple film capacitors are connected in parallel with each other is used. Accordingly, the module of a conventional capacitor circuit that includes only a film capacitor has an increased size.

A capacitor circuit in which a ceramic capacitor having a high allowable ripple current, a high heat resistance, a low ESR, and a low ESL is combined with a film capacitor has been proposed as a capacitor circuit for improving the allowable ripple current without excessively increasing the size of the enclosure.

FIG. 11 is an equivalent circuit diagram of a smoothing capacitor circuit in which a plurality of capacitors are connected in parallel with each other.

As shown in FIG. 11, a smoothing capacitor circuit 101 includes a film capacitor 111 and a ceramic capacitor 112 that are connected in parallel with each other. The film capacitor 111 has a capacitance C111, as well as an equivalent series resistance (ESR) R111 and an equivalent series inductance (ESL) L111. A feature of the ceramic capacitor 112 is to have a capacitance C112, as well as characteristics of an equivalent series resistance (ESR) R112 and an equivalent series inductance (ESL) L112.

Unfortunately, in the above-described capacitor circuit in which the film capacitor and the ceramic capacitor are connected in parallel with each other, the film capacitor has impedance characteristics that are different from those of the ceramic capacitor.

FIG. 12A is a graph showing the respective impedance-frequency characteristics of the film capacitor 111 circuit and the ceramic capacitor 112 circuit shown in FIG. 11 and the combined impedance-frequency characteristic of the capacitor circuit 101. FIG. 12B is a graph showing the respective current-frequency characteristics of the film capacitor 111 circuit and the ceramic capacitor 112 circuit exhibited when an external current having an RMS value of 1 A was applied to the capacitor circuit 101.

FIG. 13A is a graph showing the frequency spectrum of the current of the film capacitor 111 circuit. FIG. 13B is a graph showing the frequency spectrum of the current of the ceramic capacitor 112 circuit.

The simulations whose results are shown in FIGS. 12A to 13B were conducted under the following conditions. The capacitance C111 of the film capacitor 111 is about 1160 µF, the series resistance component R111 is about 0.75 mΩ, and the series inductance component L111 is about 20 nH. The capacitance C112 of the ceramic capacitor 112 is about 40 µF, the series resistance component R112 is about 2 mΩ, and the series inductance component L112 is about 2 nH. An alternating current having an rms value of about 1 A and about 1 kHz to about 10 MHz from a constant current source was applied to the capacitor circuit 101 having these element parameters.

As shown in FIG. 12A, the film capacitor 111 has an impedance-frequency characteristic different from that of the ceramic capacitor 112. The parallel connection between the capacitors having the different impedance-frequency characteristics, as described above, causes parallel resonance, since the magnitude of inductive reactance and that of capacitive reactance are matched in the closed circuit provided by the two lines. For example, in FIG. 12A, parallel resonance occurs around 200 kHz. The difference between this parallel resonant frequency and the series resonant frequencies of the lines generates a resonant current, which circulates through the closed circuit composed of the circuit in which the two capacitors are connected in parallel with each other.

If the ripple current flowing from the switching circuit includes the parallel resonant frequency components, the parallel resonant frequency components of the ripple current are amplified so that each capacitor current becomes a significant overcurrent as shown in the current value of FIG. 12B or in the spectrum of about 100 kHz to about 200 kHz of FIGS. 13A and 13B. The overcurrent of the parallel resonant frequency components heats the film capacitor, which reduces the allowable ripple current of the smoothing capacitor circuit.

SUMMARY OF THE INVENTION

To overcome the problems described above, preferred embodiments of the present invention provide a capacitor circuit that prevents parallel resonance between components thereof, and includes multiple capacitors, so as to achieve a substantial increase in the resistance against an unwanted external high-frequency current, such as an increase in allowable ripple current.

According to a preferred embodiment of the present invention, a capacitor circuit includes a first capacitor line including a first capacitor and a second capacitor line including a second capacitor having an electrical characteristic different from an electrical characteristic of the first capacitor line that are connected in parallel with each other. The capacitor circuit adjusts the reactance of at least one of the first and second capacitor lines using a resonant frequency adjustment element so that a first series resonant frequency of the first capacitor line and a second series resonant frequency of the second capacitor line are matched at a particular frequency.

In this configuration, the reactance of at least one of the first and second capacitor lines connected in parallel with each other is preferably changed so that the series resonant frequencies of the two lines are matched at the particular frequency. Thus, matching is achieved between the resonant frequency based on the inductive reactance and the capacitive reactance within the closed circuit including the two lines and the series resonant frequencies of the lines. This prevents the first and second capacitor lines from generating a resonant current.

The impedance of each line at the particular frequency is preferably equivalent to that of the pure resistance components of the line. Accordingly, the particular frequency components of an unwanted high-frequency signal flowing from the outside are branched in accordance with the ratio between the respective pure resistance components of the lines.

Moreover, in the configuration according to various preferred embodiments of the present invention, the particular frequency is preferably set as the frequency at which the current value of the flowing high-frequency signal is maximized in the frequency band of the high-frequency signal. Thus, the current is branched at the frequency at which the current value of the high-frequency signal is maximized, that is, at the frequency that has the largest influence on the allowable current value of the capacitor circuit.

Furthermore, the impedance of the first capacitor line at the particular frequency is preferably greater than that of the second capacitor line at the particular frequency. Thus, a greater amount of the signal branched at the particular frequency flows into the second capacitor line than that which flows into the first capacitor line, so as to more effectively suppress the high-frequency signal flowing into the first capacitor line. This reduces heating of the first capacitor.

According to various preferred embodiments of the present invention, a capacitor circuit is provided that prevents parallel resonance between components thereof, and includes multiple capacitors so as to increase the allowable ripple current, and a power conversion circuit including the capacitor circuit.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6A and FIG. 6B include graphs showing the frequency spectrum of the current with respect to the capacitor circuit according to the second preferred embodiment of the present invention.

DETAILED DESCRIPTION OF THE PREFERRED EMBODIMENTS

A capacitor circuit according to a first preferred embodiment of the present invention will be described with reference to the drawings.

Figure 1:
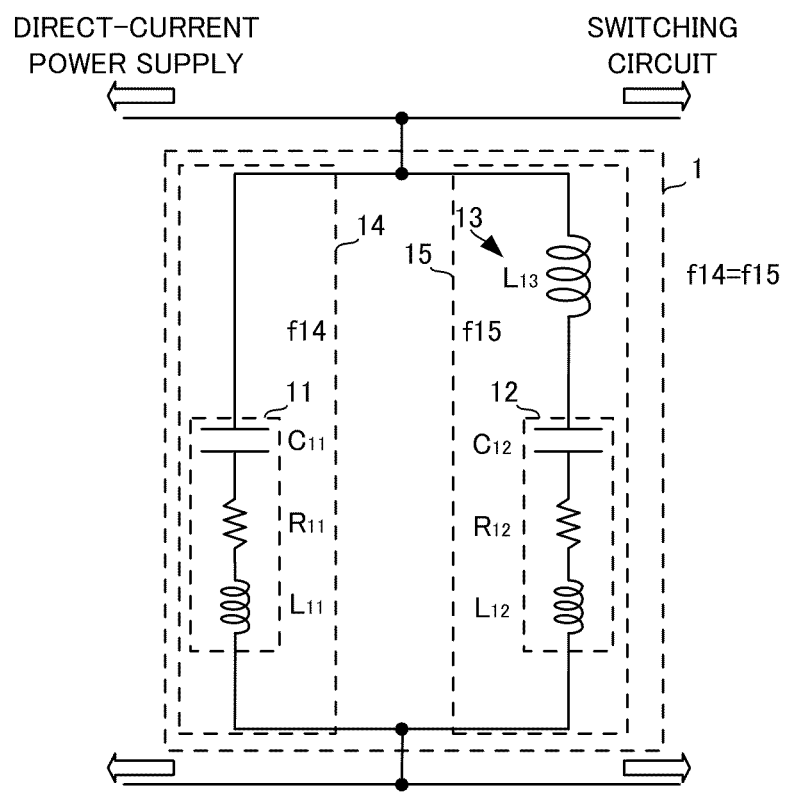
FIG. 1 is an equivalent circuit diagram of a capacitor circuit according to a first preferred embodiment of the present invention.

FIG. 1 is an equivalent circuit diagram of a capacitor circuit 1 according to the first preferred embodiment of the present invention.

The capacitor circuit 1 according to the first preferred embodiment is a smoothing capacitor circuit, which is connected in parallel between a direct-current power supply and a switching circuit in an inverter circuit.

As shown in FIG. 1, in the capacitor circuit 1, a first capacitor line 14 including a film capacitor 11 and a second capacitor line 15 including a ceramic capacitor 12 are connected in parallel with each other.

The first capacitor line 14 preferably includes the film capacitor 11 and a line conductor to which the external electrodes of the film capacitor 11 are connected. The film capacitor 11 preferably includes an organic insulating material, such as polypropylene, as a dielectric, for example. A feature of the first capacitor line 14 is to have a predetermined capacitance C11, as well as a series resistance component (ESR) R11 and a series inductance component (ESL) L11. Due to such a configuration, the first capacitor line 14 has a series resonant frequency f14 based on the capacitance C11 and the series inductance component L11 of the film capacitor 11.

The second capacitor line 15 preferably includes the ceramic capacitor 12 and a line conductor to which the external electrodes of the ceramic capacitor 12 are connected. This line conductor includes an inductance element 13 having a predetermined inductance L13. The inductance element 13 corresponds to a resonant frequency adjustment element according to a preferred embodiment of the present invention. Specifically, the second capacitor line 15 preferably includes a circuit in which the ceramic capacitor 12 and the inductance element 13 are connected in series with each other. The ceramic capacitor 12 preferably includes a ceramic material as a dielectric, for example. The ceramic capacitor 12 preferably has a predetermined capacitance C12, as well as a series resistance component (ESR) R12 and a series inductance component (ESL) L12. Due to such a configuration, the second capacitor line 15 has a series resonant frequency f15 based on the capacitance C12 and the series inductance component L12 of the ceramic capacitor 12.

The inductance L13 of the inductance element 13 is preferably set to a value such that the series resonant frequency f14 of the first capacitor line 14 and the series resonant frequency f15 of the second capacitor line 15 are matched.

Such a configuration prevents parallel resonance between the first capacitor line 14 and the second capacitor line 15, that is, between the film capacitor 11 and the ceramic capacitor 12.

FIGS. 2A to 3B show the results of specific simulations. The simulations whose results are shown in FIGS. 2A to 3B were conducted under the following conditions. The capacitance C11 of the film capacitor 11 was about 1160 µF, the series resistance component R11 was about 0.75 mΩ, and the series inductance component L11 was about 20 nH. The capacitance C12 of the ceramic capacitor 12 was about 40 µF, the series resistance component R12 was about 2 mΩ, and the series inductance component L12 was about 2 nH. The inductance L13 of the inductance element 13 was about 578 nH. A high-frequency current having an rms value of about 1 A and about 1 kHz to about 10 MHz from a constant current source was applied to the capacitor circuit 1 having these element parameters. In the description below, an alternating current having a frequency band between about 1 kHz and about 10 MHz or about 20 MHz is referred to as a high frequency.

Figure 2A:
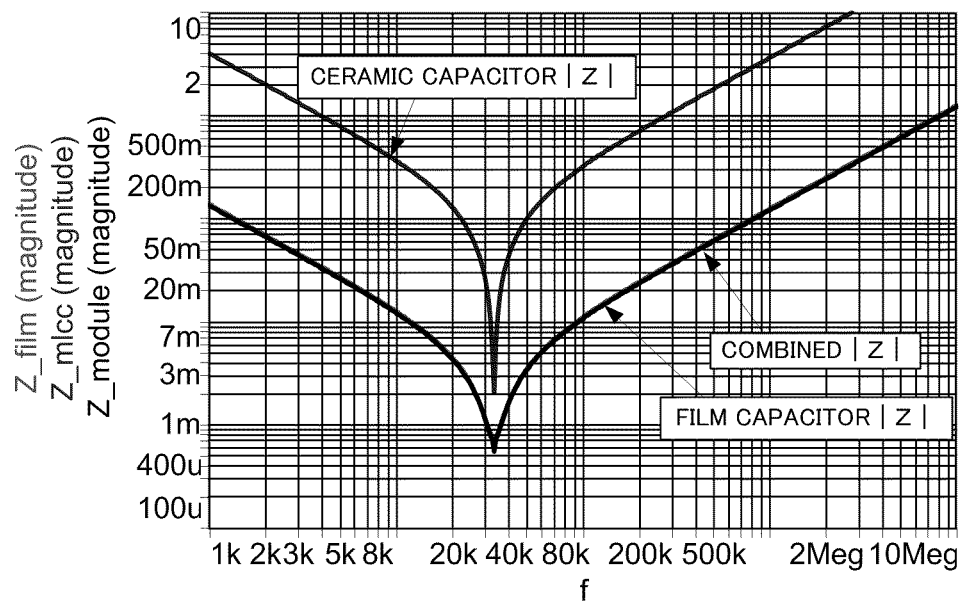
FIG. 2A and FIG. 2B include graphs showing impedance characteristics and current characteristics with respect to the capacitor circuit according to the first preferred embodiment of the present invention.
Figure 2B:
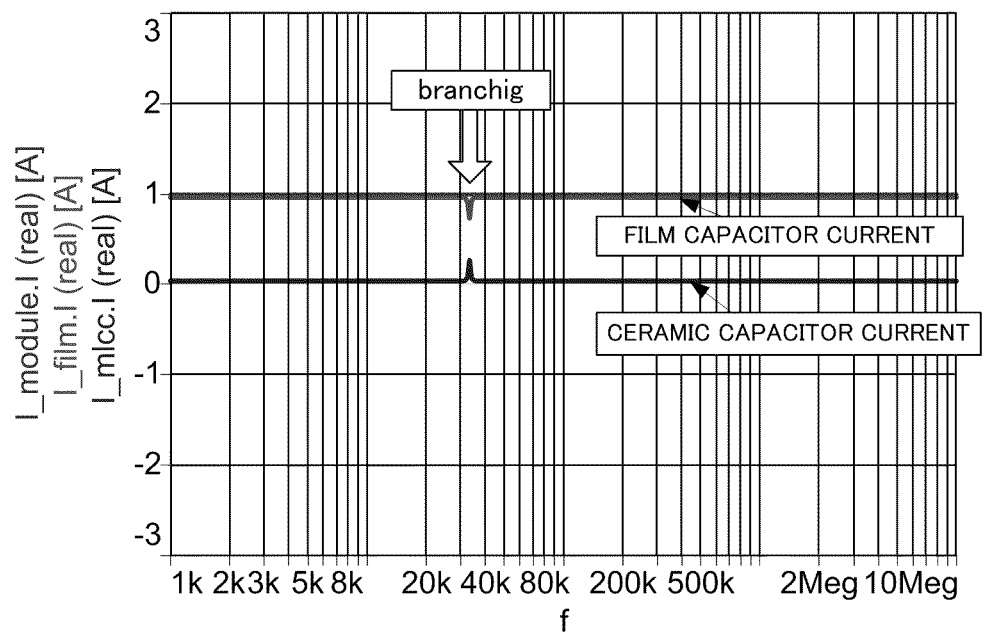
Figure 3A:
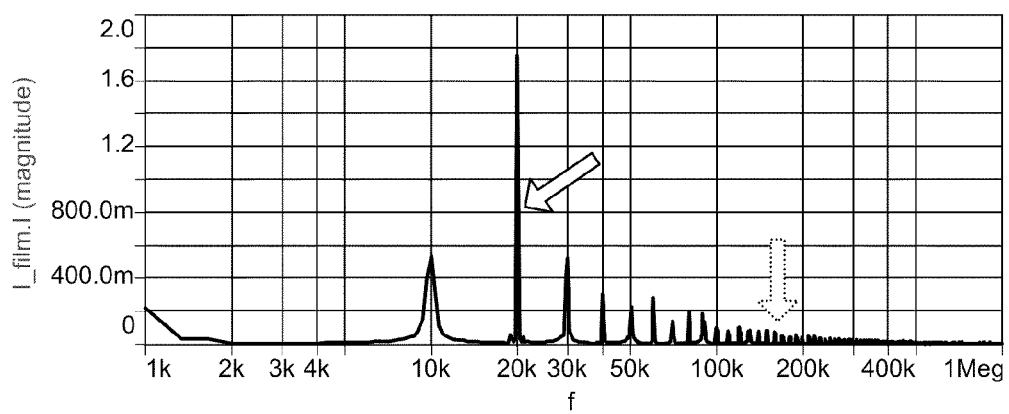
FIG. 3A and FIG. 3B include graphs showing the frequency spectrum of the current with respect to the capacitor circuit according to the first preferred embodiment of the present invention.
Figure 3B:
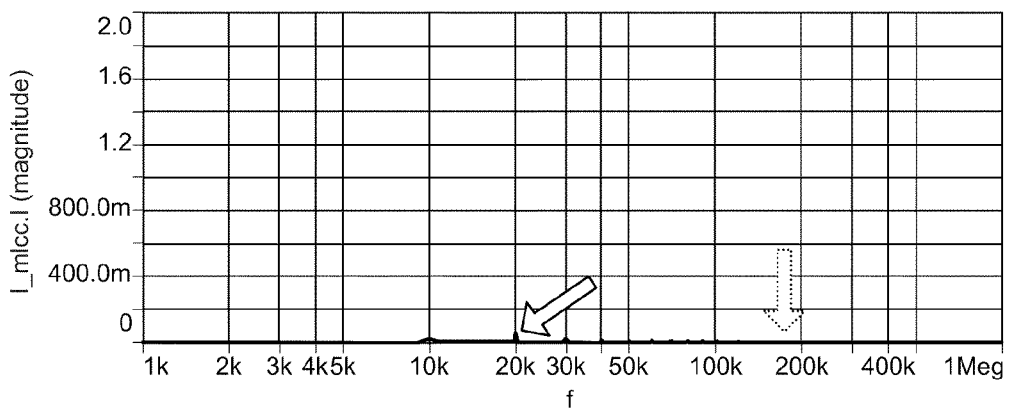

FIG. 2A is a graph showing the respective impedance characteristics of the first capacitor line 14 (filter capacitor) and the second capacitor line 15 (ceramic capacitor) shown in FIG. 1 and the combined impedance characteristic of the capacitor circuit 1 and the combined impedance characteristic of the capacitor circuit 1. FIG. 2B is a graph showing the current of the first capacitor line 14 (film capacitor) and the current of the second capacitor line 15 (ceramic capacitor) exhibited when an external current having an RMS value of about 1 A was applied to the capacitor circuit 1. FIG. 3A is a graph showing the frequency spectrum of the current of the first capacitor line 14. FIG. 3B is a graph showing the frequency spectrum of the current of the second capacitor line 15.

Figure 12A:
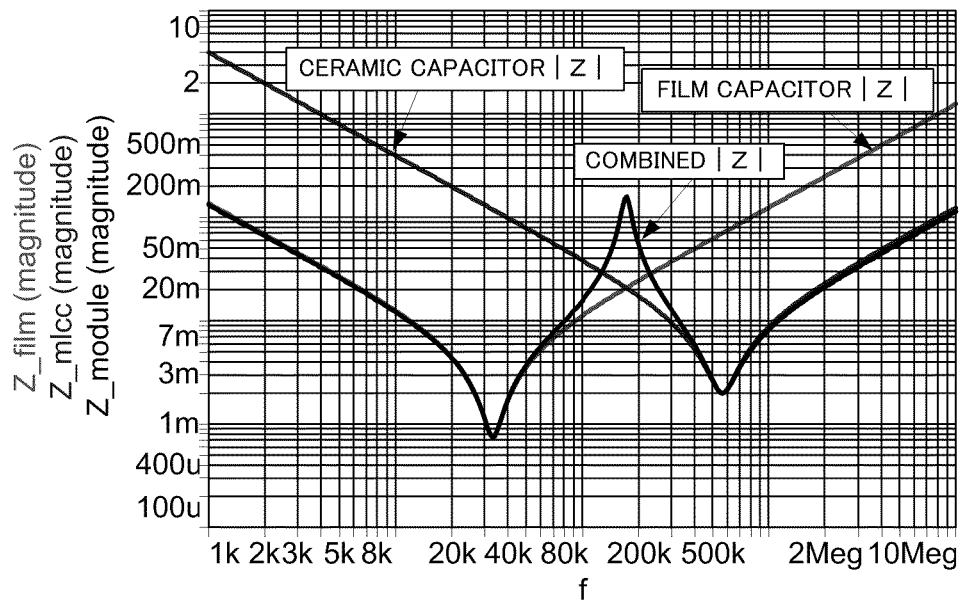
FIG. 12A and FIG. 12B include graphs showing impedance characteristics and current characteristics with respect to the capacitor circuit 101 according to the related art.
Figure 12B:
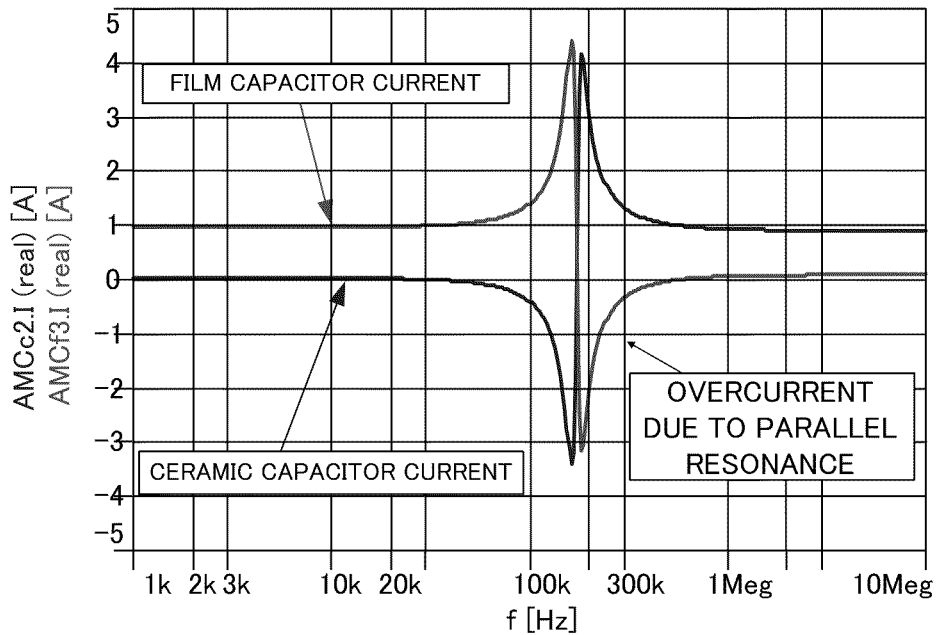
Figure 13A:
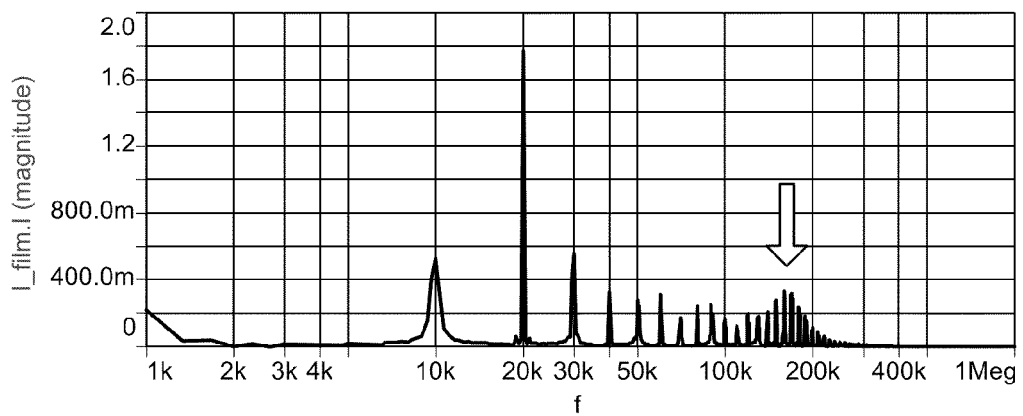
FIG. 13A and FIG. 13B include graphs showing the frequency spectrum of the current with respect to the capacitor circuit 101 according to the related art.
Figure 13B:
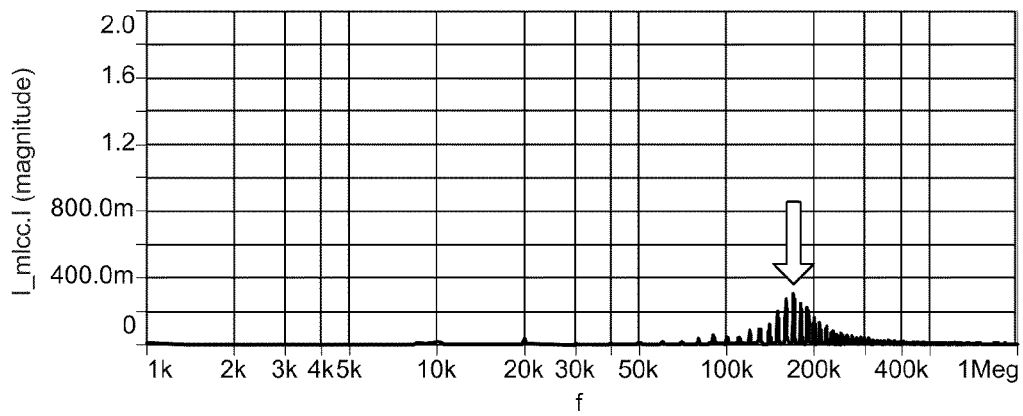

The configuration in which the second capacitor line 15 includes the inductance element 13 according to the first preferred embodiment achieves matching between the respective series resonant frequencies of the first capacitor line 14 and the second capacitor line 15. Thus, matching is achieved between the resonant frequency based on the inductive reactance and the capacitive reactance within the closed circuit defined by the two lines and the series resonant frequencies of the lines. Accordingly, the first and second capacitor lines generate no resonant current. That is, the overcurrent at about 200 kHz as shown in FIG. 12B according to the related art does not occur in FIG. 2B. Thus, as is also understood from the frequency spectrum shown in FIGS. 3A and 3B, the spectrum rising at about 200 kHz as shown in FIGS. 13A and 13B is prevented.

Thus, the first preferred embodiment effectively prevents parallel resonance so as to prevent overcurrent at a particular frequency. Thus, the allowable ripple current of the capacitor circuit 1 is significantly increased.

At the frequency at which the matching is achieved, the respective impedances of the first capacitor line 14 and the second capacitor line 15 include only pure resistance components. Accordingly, the current flowing into the first capacitor line 14 and the current flowing into the second capacitor line 15 are inversely proportional to the ratio between the respective pure resistance components of the lines 14 and 15. The respective impedances of the first capacitor line 14 and the second capacitor line 15 are closer to each other at a resonant frequency than at other frequencies due to the characteristics of the combination of these capacitors. For this reason, the current that flows only into the first capacitor line 14 at other frequencies is branched into the second capacitor line 15 in the frequency band with the resonant frequency as the center. Thus, the value of the current that flows into the film capacitor 11 is suppressed at the resonant frequency so as to further increase the allowable ripple current at the resonant frequency.

Next, a capacitor circuit according to a second preferred embodiment of the present invention will be described with reference to the drawings.

Figure 4:
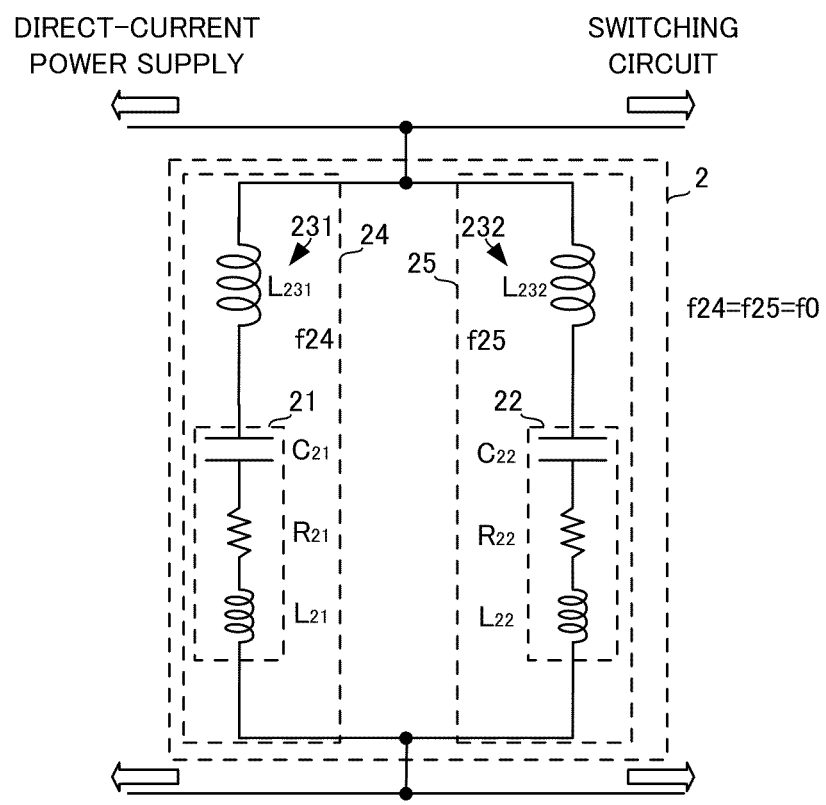
FIG. 4 is an equivalent circuit diagram of a capacitor circuit according to a second preferred embodiment of the present invention.

FIG. 4 is an equivalent circuit diagram of a capacitor circuit 2 according to the second preferred embodiment.

As shown in FIG. 4, in the capacitor circuit 2 according to the second preferred embodiment, a first capacitor line 24 including a film capacitor 21 and a second capacitor line 25 including a ceramic capacitor 22 are connected in parallel with each other, similar to the first preferred embodiment.

The first capacitor line 24 preferably includes the film capacitor 21 and a line conductor to which the external electrodes of the film capacitor 21 are connected. This line conductor includes an inductance element 231 having a predetermined inductance L231. That is, the first capacitor line includes a circuit in which the film capacitor 21 and the inductance element 231 are connected in series with each other. The film capacitor 21 preferably has a predetermined capacitance C21, as well as a series resistance component (ESR) R21 and a series inductance component (ESL) L21. Due to this configuration, the first capacitor line 24 preferably has a series resonant frequency f24 based on the capacitance C21 of the film capacitor 21, the series inductance component L21, and the inductance L231 of the inductance element 231.

The second capacitor line 25 preferably includes the ceramic capacitor 22 and a line conductor to which the external electrodes of the ceramic capacitor 22 are connected. This line conductor includes an inductance element 232 having a predetermined inductance L232. That is, the second capacitor line 25 preferably includes a circuit in which the ceramic capacitor 22 and the inductance element 232 are connected in series with each other. The ceramic capacitor 22 preferably has a predetermined capacitance C22, as well as a series resistance component (ESR) R22 and a series inductance component (ESL) L22.

Both the inductance L231 of the inductance element 231 and the inductance L232 of the inductance element 232 are preferably set to a value such that the series resonant frequency f24 of the first capacitor line 24 and the series resonant frequency f25 of the second capacitor line 25 are matched at a particular frequency f0. The particular frequency f0 is preferably set as the frequency at which the current value of the ripple current having a predetermined bandwidth flowing into the capacitor circuit 2 from the outside is maximized.

Such a configuration prevents parallel resonance between the first capacitor line 24 and the second capacitor line 25, that is, between the film capacitor 21 and the ceramic capacitor 22.

As shown in the first preferred embodiment, the current is branched into the first capacitor line 24 and the second capacitor line 25 at the series resonant frequency. Thus, the current can be branched at the frequency at which the current value of an unwanted high-frequency signal is maximized. This increases the influence of current branching over an increase in allowable ripple current.

FIGS. 5A to 6B show the results of specific simulations. The simulations whose results are shown in FIGS. 5A to 6B were conducted under the following conditions, assuming that the value of the ripple current was maximized at about 20 kHz. The same capacitors as the film capacitor 11 and the ceramic capacitor 12 shown in the simulation of the first preferred embodiment were preferably used as the film capacitor and the ceramic capacitor 22. The inductance L231 of the inductance element 231 connected to the film capacitor 21 in series was about 34.6 nH, and the inductance L232 of the inductance element 232 connected to the ceramic capacitor 22 in series was about 1581 nH. As in the first preferred embodiment, a high-frequency current having an RMS value of about 1 A and about 1 kHz to about 10 MHz from a constant current source was applied to the capacitor circuit 2 having these element parameters.

Figure 5A:
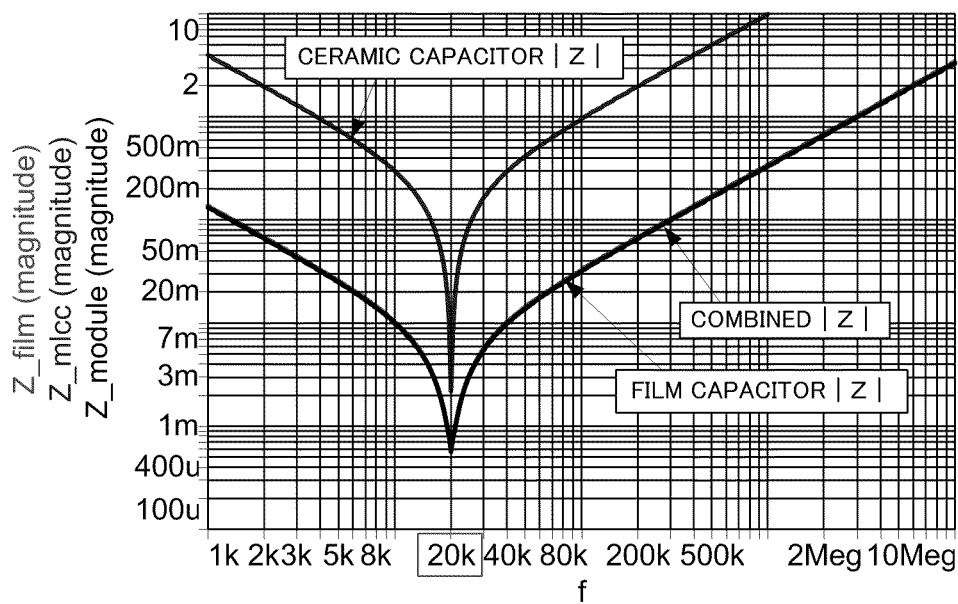
FIG. 5A and FIG. 5B include graphs showing impedance characteristics and current characteristics with respect to the capacitor circuit according to the preferred second embodiment of the present invention.
Figure 5B:
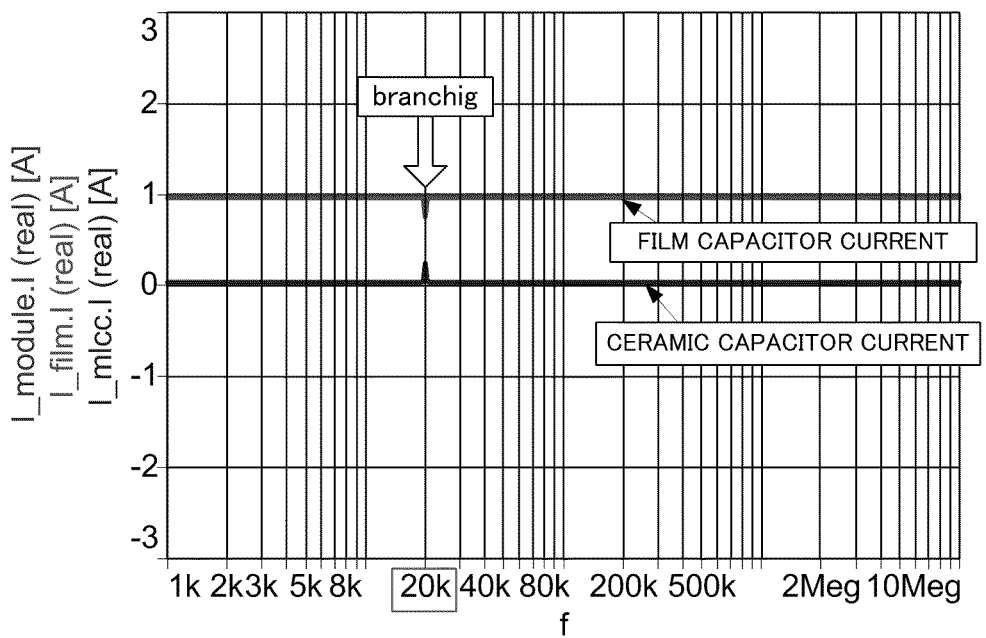

FIG. 5A is a graph showing the respective impedance characteristics of the first capacitor line 24 (filter capacitor) and the second capacitor line 25 (ceramic capacitor) shown in FIG. 4 and the combined impedance characteristic of the capacitor circuit 2. FIG. 5B is a graph showing the current of the first capacitor line 24 (film capacitor) and the current of the second capacitor line 25 (ceramic capacitor) exhibited when an external current having an RMS value of about 1 A was applied to the capacitor circuit 2. FIG. 6A is a graph showing the frequency spectrum of the current of the first capacitor line 24. FIG. 6B is a graph showing the frequency spectrum of the current of the second capacitor line 25.

The configuration in which the first capacitor line 24 includes the inductance element 231 and the second capacitor line 25 includes the inductance element 232 according to the second preferred embodiment allows the series resonant frequencies of the first and second capacitor line 24 and 25 in parallel to be simultaneously shifted. Thus, as shown in FIG. 5A, the series resonant frequencies of the first capacitor line 24 and the second capacitor line 25 are matched at the particular frequency f0=about 20 kHz. Accordingly, matching is achieved between the resonant frequency based on the inductive reactance and the capacitive reactance within the closed circuit defined by the two lines and the series resonant frequencies of the lines. For this reason, the first and second capacitor lines generate no resonant current. That is, the overcurrent at about 200 kHz as shown in FIG. 12B according to the related art does not occur in FIG. 5B. Thus, as is also understood from the frequency spectrum shown in FIGS. 6A and 6B, the spectrum rising at about 200 kHz as shown in FIGS. 13A and 13B according to the related art is suppressed.

The configuration of the second preferred embodiment effectively prevents parallel resonance so as to prevent overcurrent at local frequencies. This increases the allowable ripple current of the capacitor circuit 2.

Moreover, the ripple current is branched into the second capacitor line 25 at the frequency f0 at which the ripple current is maximized. Thus, as shown in FIGS. 6A and 6B, the amount of current flowing into the film capacitor 21 is reduced at the frequency f0 (about 20 kHz) at which the current value is high, as compared to FIGS. 3A and 3B. At that time, the branched current flows into the ceramic capacitor 22. Since the ceramic capacitor 22 has a greater heat resistance and allowable ripple current than the film capacitor 21, it can tolerate heating that may occur in the film capacitor 21, without any problems. The current flowing into the film capacitor 21 is reduced at the maximum current value frequency, which has the greatest influence on the allowable ripple current, and is branched into the ceramic capacitor 22. This more effectively increases the allowable ripple current of the capacitor circuit 2.

Next, a capacitor circuit according to a third preferred embodiment of the present invention will be described with reference to the drawings.

Figure 7:
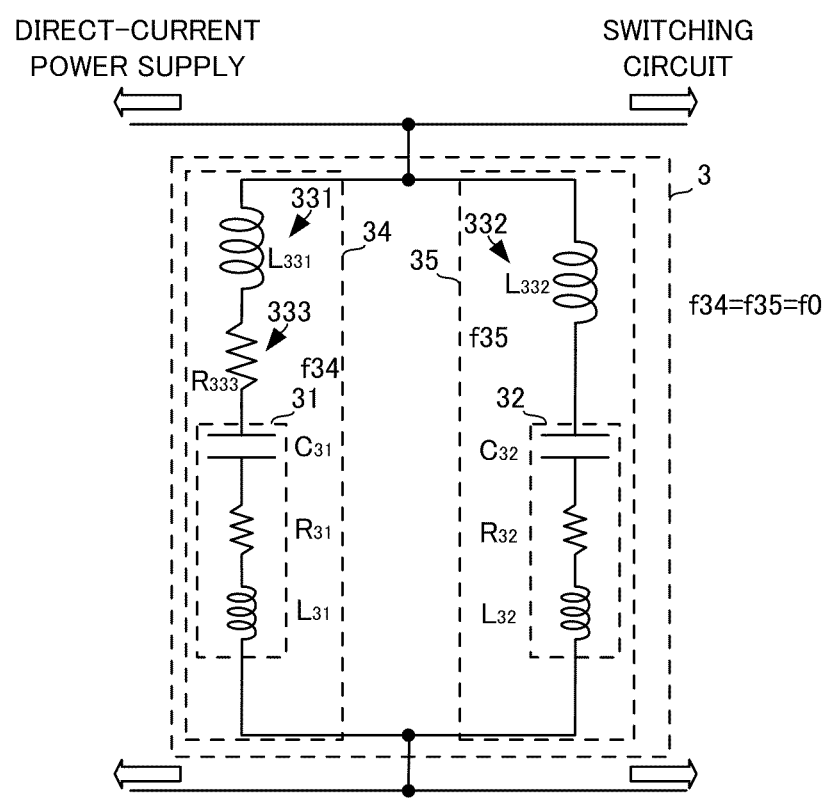
FIG. 7 is an equivalent circuit diagram of a capacitor circuit according to a third preferred embodiment of the present invention.

FIG. 7 is an equivalent circuit diagram of a capacitor circuit 3 according to the third preferred embodiment.

As shown in FIG. 7, in the capacitor circuit 3 according to the third embodiment, a first capacitor line 34 including a film capacitor 31 and a second capacitor line 35 including a ceramic capacitor 32 are connected in parallel with each other, similar to the first and second preferred embodiments.

The capacitor circuit 3 according to the third embodiment includes a resistance element 333 connected in series with the first capacitor line 34 including the film capacitor 31 connected thereto. The remaining configuration of the capacitor circuit 3 is substantially the same as that of the capacitor circuit 2 according to the second preferred embodiment shown in FIG. 4. The resistance element 333 corresponds to an impedance adjustment element according to a preferred embodiment of the present invention.

The resistance element 333 is preferably, for example, a resistor defined by discrete components having a resistance value R333. While an example in which a resistor defined by discrete components is used is described in the third preferred embodiment, the resistance value R333 may be provided by changing the shape of the line conductor. The resistance value R333 is preferably set so that the impedance of the second capacitor line 35 is less than that of the first capacitor line in a predetermined frequency band near the particular frequency f0. The resistance value R333 is also preferably set so that the impedance of the second capacitor line 35 is significantly (for example, one, two, or more digits) less than that of the first capacitor line 34 at the particular frequency f0.

Due to this configuration, the ripple current flows into the ceramic capacitor 32 at about the particular frequency f0 so as to reduce the current flowing into the film capacitor 31.

As seen, the current flowing into the film capacitor 31 is more significantly reduced at the maximum current value frequency, which has the greatest influence on the ripple current, and is branched into the ceramic capacitor 32. This increases the allowable ripple current of the capacitor circuit 3 more effectively than in the configuration according to the second preferred embodiment. Moreover, since the current flowing into the first capacitor line 34 is consumed by the resistance element 333, the film capacitor 31 is effectively prevented from being heated.

FIGS. 8A to 9B show the results of specific simulations. The simulations whose results are shown in FIGS. 8A to 9B were conducted with the resistance value R333 set to about 50 mΩ and the other parameters being substantially the same as those in the second preferred embodiment.

Figure 8A:
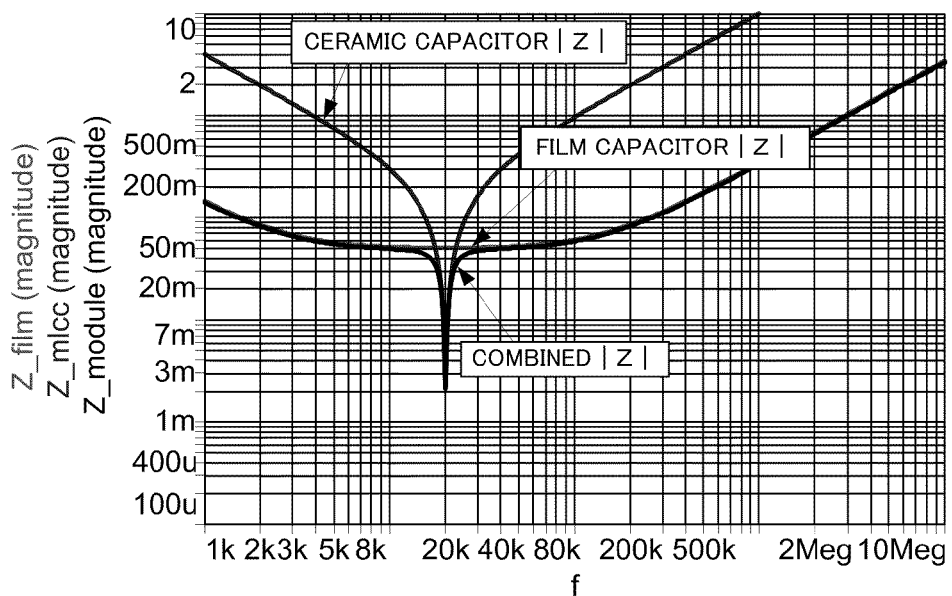
FIG. 8A and FIG. 8B include graphs showing impedance characteristics and current characteristics with respect to the capacitor circuit according to the third preferred embodiment of the present invention.
Figure 8B:
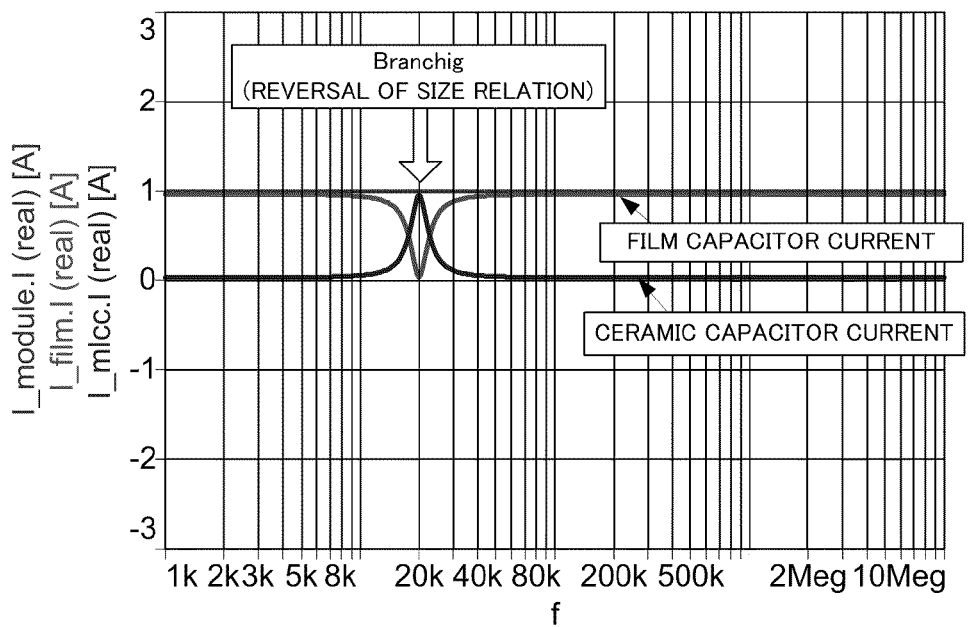
Figure 9A:
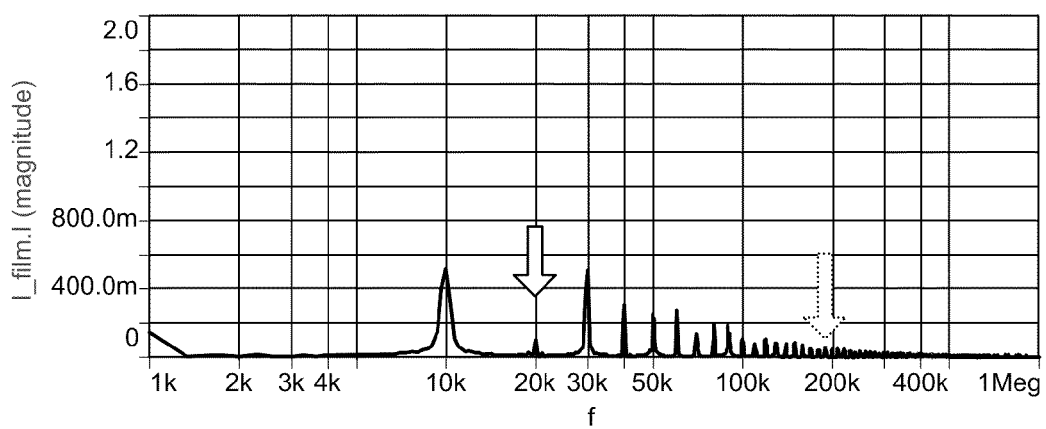
FIG. 9A and FIG. 9B include graphs showing the frequency spectrum of the current with respect to the capacitor circuit according to the third preferred embodiment of the present invention.
Figure 9B:
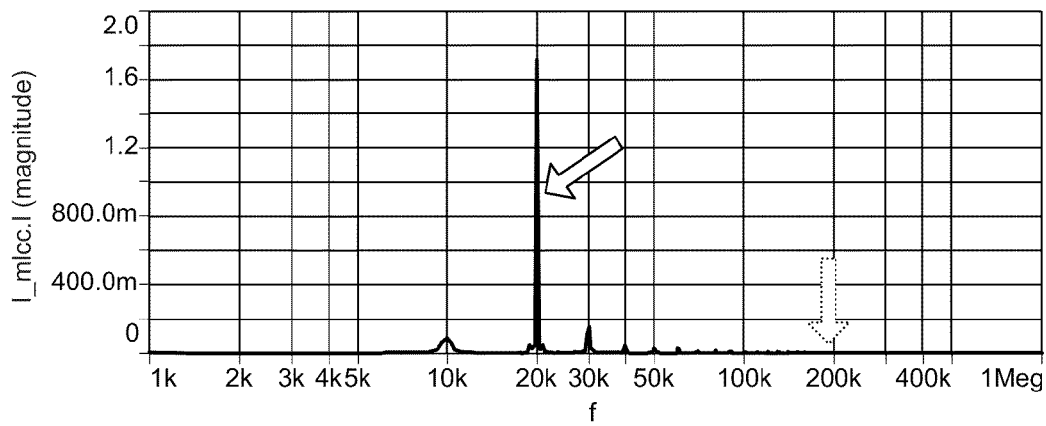

FIG. 8A is a graph showing the respective impedance characteristics of the first capacitor line 34 (filter capacitor) and the second capacitor line 35 (ceramic capacitor) shown in FIG. 7 and the combined impedance characteristic of the capacitor circuit 3. FIG. 8B is a graph showing the current of the first capacitor line 34 (film capacitor) and the current of the second capacitor line 35 (ceramic capacitor) exhibited when an external current having an rms value of 1 A is applied to a capacitor circuit 5. FIG. 9A is a graph showing the frequency spectrum of the current of the first capacitor line 34. FIG. 9B is a graph showing the frequency spectrum of the current of the second capacitor line 35.

The configuration in which the first capacitor line 34 further includes the resistance element 333 according to the third preferred embodiment reduces the impedance of the second capacitor line 35 to less than that of the first capacitor line 34 at the particular frequency f0. Thus, as shown in FIG. 8A, the impedance of the second capacitor line 35 is less at the particular frequency f0. Thus, as shown in FIG. 8B, the relationship between the current value of the first capacitor line 34 and that of the second capacitor line 35 is reversed around the particular frequency f0. Moreover, almost all the current flows into the second capacitor line 35 at the particular frequency f0. As described in the second preferred embodiment, the ceramic capacitor 32 has a greater allowable ripple current and a greater heat resistance than the film capacitor 31. Accordingly, even when all of the ripple current flowing into the capacitor circuit 3 flows into the ceramic capacitor 32, the ceramic capacitor 32 can tolerate heating that may occur in the film capacitor 21, without any problems.

The current flowing into the film capacitor 31 is significantly reduced at the maximum current value frequency, which has the greatest influence on the allowable ripple current, so that almost all of the current flows into the ceramic capacitor 32. This more effectively increases the allowable ripple current of the capacitor circuit 3.

Next, an inverter circuit according to a fourth preferred embodiment will be described with reference to the drawings.

Figure 10:
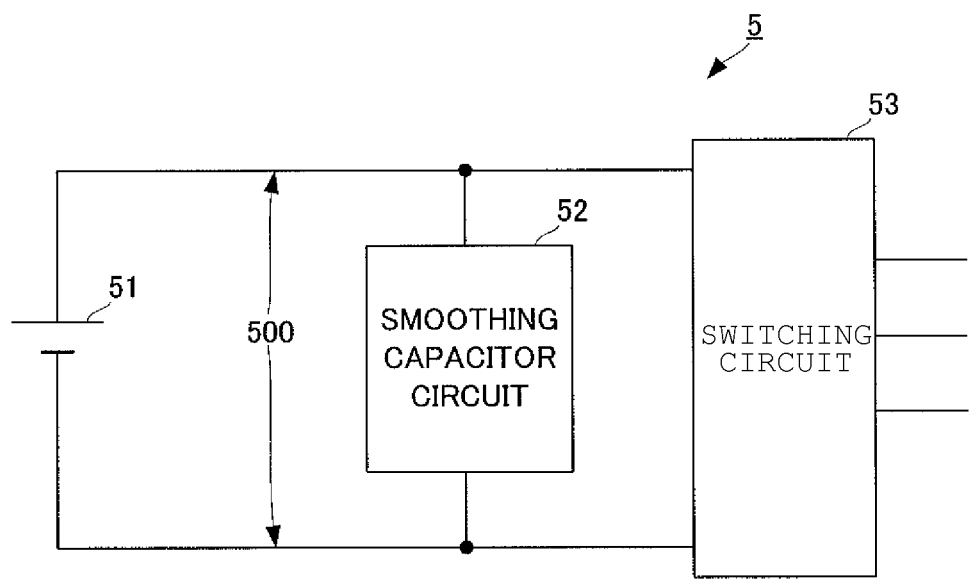
FIG. 10 is a block diagram showing the circuit configuration of an inverter circuit according to a fourth preferred embodiment of the present invention.
Figure 11:
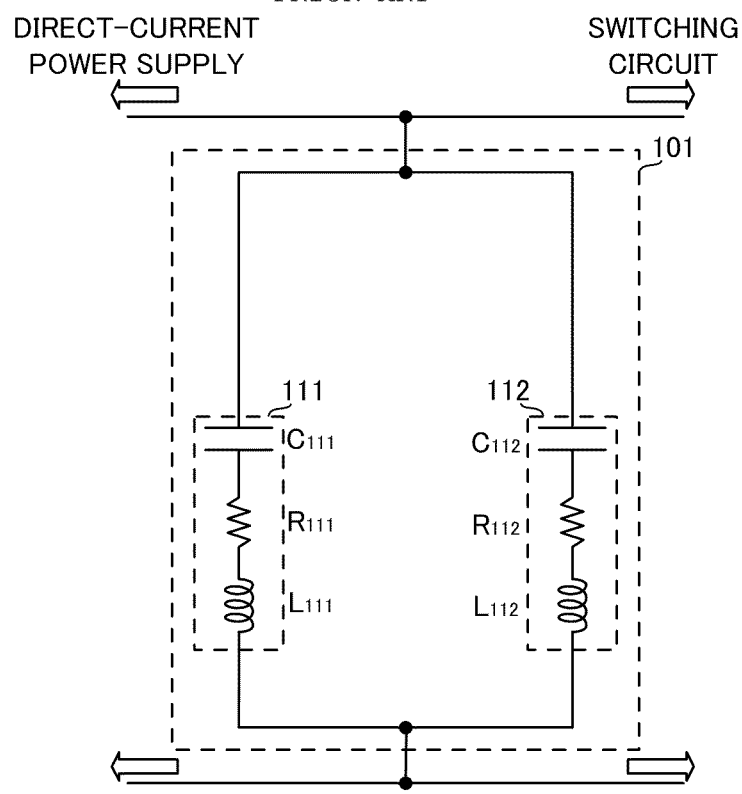
FIG. 11 is an equivalent circuit diagram of a capacitor circuit 101 according to the related art.

FIG. 10 is a block diagram showing the circuit configuration of an inverter circuit 5 according to the fourth preferred embodiment.

As shown in FIG. 10, the inverter circuit 5 includes a direct-current power supply 51 preferably defined by a battery or other suitable power supply, for example, a switching circuit 53, and a smoothing capacitor circuit 52 defined by the capacitor circuit shown in any one of the above-described preferred embodiments. The smoothing capacitor circuit 52 is connected in parallel with a connection line 500 between the direct-current power supply 51 and the switching circuit 53.

Preferably, the switching circuit 53 is defined by semiconductor switches, for example, and is PWM controlled by, for example, a control unit (not shown). Thus, the switching circuit 53 converts direct-current power into alternating-current power and outputs the three-phase alternating current to a motor or other suitable device (not shown).

By using the smoothing capacitor circuit 52 having the configuration of any one of the above-described preferred embodiments in the inverter circuit 5, an inverter circuit having a high allowable ripple current can be provided without increasing the size thereof.

Moreover, a snubber capacitor may preferably be connected in parallel on the input side of the switching circuit 53 in the inverter circuit 5. In this case, a third capacitor line including a snubber capacitor may preferably be further connected in parallel with the first capacitor line including the film capacitor and the second capacitor line including the ceramic capacitor. Thus, a capacitor circuit in which the smoothing capacitor circuit and the snubber capacitor are combined is provided.

In the fourth preferred embodiment, the inverter circuit that converts direct-current power into alternating-current power has been shown as an example. Even in the case of a circuit that converts alternating-current power into direct-current power, the above-described advantages can be obtained as long as the capacitor circuit shown in any one of the first to third preferred embodiments is disposed in the direct-current power side of the converter circuit. Moreover, the capacitor circuit shown in any one of the above-described preferred embodiments can be used in a DC-DC converter or other suitable device that converts direct-current power into different direct-current power.

Figure 14:
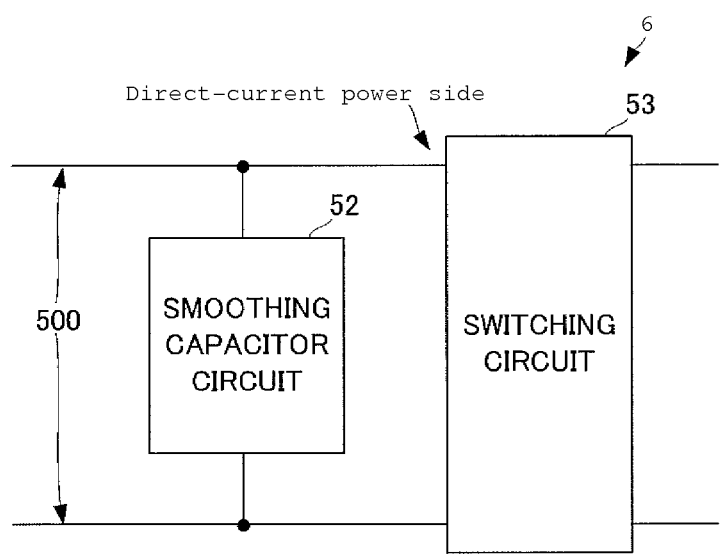
FIG. 14 is a block diagram showing the circuit configuration of a conversion circuit according to another preferred embodiment of the present invention.

As shown in FIG. 14, the conversion circuit 6 includes a switching circuit 53, and a smoothing capacitor circuit 52 defined by the capacitor circuit shown in any one of the above-described preferred embodiments. The smoothing capacitor circuit 52 is connected in parallel with a connection line 500 on a direct current power side of the switching circuit 53.

Preferably, the switching circuit 53 is defined by semiconductor switches, for example, and is PWM controlled by, for example, a control unit (not shown). Thus, the switching circuit 53 converts direct-current power into alternating-current power and outputs the three-phase alternating current to a motor or other suitable device (not shown).

By using the smoothing capacitor circuit 52 having the configuration of any one of the above-described preferred embodiments in the conversion circuit 6 shown in FIG.14, a conversion circuit having a high allowable ripple current can be provided without increasing the size thereof.

While an example in which the inductor element included in the capacitor line is connected in series with the capacitor has been shown in the above-described preferred embodiments, an inductor may preferably be provided by changing the shape of the line conductor, for example.

While an example in which the electrical characteristics of the film capacitor or ceramic capacitor are not changed has been shown in the above-described preferred embodiments, an electrical characteristic of the film capacitor or ceramic capacitor, for example, the series inductance component (ESL) or series resistance component (ESR) may be changed or the capacitance of the ceramic capacitor may preferably be changed. In these cases, the characteristics can be adjusted simply by replacing the capacitor with a known capacitor. Moreover, the need to adjust the shape of the line conductor can be eliminated or reduced.

While the capacitor circuit in which the film capacitor and the ceramic capacitor are combined has been shown as an example in the above-described preferred embodiments, an aluminum electrolytic capacitor may preferably used instead of the film capacitor, or a tantalum capacitor may preferably be used instead of the ceramic capacitor, for example. A capacitor using a different organic insulating material may preferably be used as the film capacitor, for example.

While the capacitor circuit in which the different types of capacitors are connected in parallel with each other has been shown as an example in the above-described preferred embodiments, the above-described configurations are also applicable to the same type of capacitors having different characteristics connected in parallel with each other. Even in this case, the above-described effects and advantages can be obtained.

While the capacitor circuit in which the capacitors having different electrical characteristics are connected in parallel with each other has been shown as an example in the above-described preferred embodiments, the above-described configurations are also applicable to a case in which different numbers of capacitors having the same electrical characteristics are connected in series with each other in the two parallel capacitor lines. Even in this case, the above-described effects and advantages can be obtained.

While an example in which the single first capacitor line including the film capacitor and the single second capacitor line including the ceramic capacitor are provided has been shown in the above-described preferred embodiments, multiple capacitor lines may preferably be provided for each capacitor line type. In this case, the inductance, the capacitance, and the resistance value may be adjusted for each capacitor line.

While the smoothing capacitor circuit for use in an inverter circuit has been shown as an example in the above-described preferred embodiments, the above-described configurations are also applicable to any capacitor circuit as long as it is a capacitor circuit in which an external, unwanted, high-current, high-frequency signal flows and that is influenced by the unwanted high-frequency signal.

In the above-described preferred embodiments, the different characteristics of each capacitor line, such as inductance and resistance, can preferably be changed simultaneously by changing the shape of the line conductor, for example.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A capacitor circuit comprising:
   a first capacitor line including a first capacitor;
   a second capacitor line connected in parallel with the first capacitor line, including a second capacitor, and having an electrical characteristic different from an electrical characteristic of the first capacitor line; and
   a resonant frequency adjustment element arranged to adjust a reactance of at least one of the first and second capacitor lines so that a first series resonant frequency of the first capacitor line and a second series resonant frequency of the second capacitor line are matched at a particular frequency; wherein
   the second capacitor has a greater allowable ripple current than the first capacitor;
   the first capacitor and the second capacitor are smoothing capacitors; and
   an impedance of the first capacitor line at the particular frequency is greater than an impedance of the second capacitor at the particular frequency.

2. The capacitor circuit according to claim 1, wherein the particular frequency is set to a frequency at which a current value of a high-frequency signal flowing into the capacitor circuit is maximized in a frequency band of the high-frequency signal.

3. The capacitor circuit according to claim 1, wherein the resonant frequency adjustment element is an inductance element included in at least one of the first and second capacitor lines.

4. The capacitor circuit according to claim 1, wherein the resonant frequency adjustment element is arranged to adjust the reactance by adjusting an internal inductance of at least one of the first and second capacitors.

5. The capacitor circuit according to claim 1, wherein the impedance adjustment element is a resistance element connected in series with the first capacitor.

6. The capacitor circuit according to claim 1, wherein the first capacitor has an electrical characteristic different from an electrical characteristic of the second capacitor.

7. The capacitor circuit according to claim 6, wherein the first capacitor is a film capacitor, and the second capacitor is a ceramic capacitor.

8. A power conversion circuit comprising:
   a conversion circuit including at least one of an alternating current-direct current conversion circuit arranged to convert direct-current power into alternating-current power or to convert alternating-current power into direct-current power and a direct-current conversion circuit arranged to convert direct-current power into a different direct-current power; and
   a capacitor circuit according to claim 1; wherein
   the capacitor circuit is connected to a direct-current power side of the alternating current-direct current conversion circuit or to at least one of the direct-current power sides of the direct-current conversion circuit.

* * * * *

UNITED STATES PATENT AND TRADEMARK OFFICE
CERTIFICATE OF CORRECTION

| | | |
|---|---|---|
| PATENT NO. | : 8,531,850 B2 | Page 1 of 1 |
| APPLICATION NO. | : 12/958477 | |
| DATED | : September 10, 2013 | |
| INVENTOR(S) | : Shoji Oka et al. | |

It is certified that error appears in the above-identified patent and that said Letters Patent is hereby corrected as shown below:

(73) Assignee on the title page of the patent, please add the following company as a second assignee:

Shizuki Electric Co., Inc., Hyogo (JP)

Signed and Sealed this
Eighteenth Day of March, 2014

Michelle K. Lee
*Deputy Director of the United States Patent and Trademark Office*